US008364569B1

United States Patent
Lee, Jr.

(10) Patent No.: US 8,364,569 B1
(45) Date of Patent: Jan. 29, 2013

(54) SYSTEM, METHOD AND INDICATOR FOR ASSESSING THE ECONOMIC PERFORMANCE OF A COUNTRY

(76) Inventor: John R. Lee, Jr., Topanga, CA (US)

( * ) Notice: Subject to any disclaimer, the term of this patent is extended or adjusted under 35 U.S.C. 154(b) by 0 days.

(21) Appl. No.: 12/905,063

(22) Filed: Oct. 14, 2010

Related U.S. Application Data

(60) Provisional application No. 61/251,689, filed on Oct. 14, 2009.

(51) Int. Cl.
*G06Q 40/00* (2012.01)
(52) U.S. Cl. ........................................ 705/36
(58) Field of Classification Search ...................... 705/36
See application file for complete search history.

(56) References Cited

U.S. PATENT DOCUMENTS

| | | | |
|---|---|---|---|
| 6,856,973 B1 * | 2/2005 | Bott ........................... | 705/36 R |
| 2006/0085325 A1 * | 4/2006 | Jammal et al. .................. | 705/38 |

OTHER PUBLICATIONS

Legatum Institute, "The 2009 Legatum Prosperity Index™: An Inquiry into Global Wealth and Wellbeing", 2009, 40 pages.
New Economics Foundation, "The unhappy planet index 2.0: Why good lives don't have to cost the Earth", Jun. 2009, 64 pages.
Terry Miller et al.,"2009 Index of Economic Freedom", 2009, 472 pages, The Heritage Foundation and Dow Jones & Company, Inc.

* cited by examiner

*Primary Examiner* — Charles Kyle
*Assistant Examiner* — Clifford Madamba
(74) *Attorney, Agent, or Firm* — Christie, Parker & Hale, LLP

(57) ABSTRACT

A system includes a computer and an attached database. The database stores inflation, unemployment, budget deficit, and gross domestic product (GDP) data for a variety of time periods for at least one country. The computer determines standard deviations, over a first time period, of an unemployment rate, a ratio of budget deficit to GDP, a GDP rate, and absolute value of an inflation rate. The computer also determines weights for each of the unemployment rate, the ratio of budget deficit to GDP, the GDP rate, and the absolute value of the inflation rate according to the ratio of the average of the standard deviations to the unemployment rate, the ratio of budget deficit to GDP, the GDP rate, and the absolute value of the inflation rate. The computer determines an economic health score for at least a second time period, the second time period being shorter than the first time period. The score is determined by subtracting an unemployment rate, a ratio of budget deficit to GDP, and the absolute value of an inflation rate, each weighted according to their respective determined weights, from a predetermined constant and adding a GDP rate, weighted by the determined weight for the GDP rate.

2 Claims, 2 Drawing Sheets

SYSTEM, METHOD AND INDICATOR FOR ASSESSING THE ECONOMIC PERFORMANCE OF A COUNTRY

CROSS-REFERENCE TO RELATED APPLICATION(S)

This application claims priority to and the benefit of U.S. Provisional Patent Application Ser. No. 61/251,689, filed on Oct. 14, 2009, the entire contents of which are incorporated herein by reference.

BACKGROUND

Today's widely used indicators attempt to measure a country's economic performance but their ability to convey useful information and trends is less than optimal. Normally these indicators incorporate a number of economic variables and are based on complicated econometric procedures that render them too complex to be of much value to the general public, the media, or even many public policy makers.

Secondly, most of the indicators measure business cycles, not the general state of the economy. GDP or GDP per capita is probably the most widely accepted indicator for measuring economic welfare in theory and practice but it provides only a limited snapshot of the economy. In addition to individual indicators, the National Bureau of Economic Research (NBER) and the Conference Board calculate composite indexes. These economic indexes are based on Stock and Watson's methodology (James H. Stock and Mark W. Watson, "New Indexes of Coincident and Learning Economic Indicators," *NBER Macroeconomics Annual* 1989, The MIT Press (1989), pp. 351-394) and are divided into leading (LEI), lagging, and coincident (CEI) economic indicators.

The first set of leading indicators was developed in the 1930's by Wesley Mitchell, Arthur Burns and their colleagues from NBER. Today, this composite index of leading indicators is widely accepted as a guide to predicting future economic activity (See technical discussion of indexes construction in *Handbook of Economic Forecasting, Volume* 1, pp. 1-1012 (2006), G. Elliott, C. W. J. Granger and A. Timmermann, eds., especially Chapter 16, "Leading Indicators" by Massimiliano Marcellino (pp. 879-960) and Chapter 17, "Forecasting with Real-Time Macroeconomic Data" by Dean Croushore (pp. 961-982)). Nevertheless, it has been strongly criticized for its lack of theoretical underpinning. The most commonly used leading economic indexes are The Conference Board Leading Economic Index™ (LEI) and the Conference Board Coincident Economic Index™ (CEI).

CEI is a weighted sum of four indicators including:
(1) employees on nonagricultural payrolls;
(2) personal income less transfer payments;
(3) industrial production; plus
(4) manufacturing and trade sales.

The LEI is a weighted sum of ten indicators including:
(1) average weekly hours, manufacturing;
(2) average weekly initial claims for unemployment insurance;
(3) manufacturers' new orders, consumer goods and materials;
(4) index of supplier deliveries-vendor performance;
(5) manufacturers' new orders, non-defense capital goods;
(6) building permits, new private housing units;
(7) stock prices, the Standard & Poor's 500 stock index;
(8) the Money supply (M2);
(9) interest rate spread, 10-year Treasury bonds less federal funds rate;
(10) Index of consumer expectations.

The variables were chosen to maximize the predictability of the indexes using complicated econometric procedures.

The most direct successor of the Stock and Watson indexes is the Chicago-Fed National Activity Index (CNFAI) which is a monthly index constructed from 85 indicators based on an extension of the methodology used to construct the original Stock-Watson coincident index.

Criticisms of the pioneering paper of Mitchell and Burns (1938) start with Tjalling Koopmans's paper, "Measurement Without Theory" (1947), which argues that there is no underlying theoretical basis for the inclusion, exclusion, or classification of measures which "limits the value . . . of the results obtained or obtainable." Marcellino adds:

[ . . . ] leading indexes [ . . . ] are subject to several criticisms. For example, there is no explicit reference to the target variable in the construction of the composite leading index and the weighting scheme is fixed over time, with periodic revisions mostly due either to data issues, such as changes in the production process of an indicator or to the past unsatisfactory performance of the index. (Chapter 16 "Leading Indicators," p. 882)

The primary aim of such indicators is to reveal and predict business cycles, not to compare the general state of the economy at different times. But even in this case, leading indicators often fail due to structural changes in the economy. Diebold and Rosebush (1991a, 1991b) put together a real-time data set on the leading indicators and came to the conclusion that "the index of leading indicators does not lead and it does not indicate!"

There are a number of other partial economic indicators that attempt to add social costs, environmental damage, income distribution, GDP growth, health, etc., such as the Index of Sustainable Economic Welfare (ISEW), the Genuine Progress Indicator (GPE) and the Happy Planet Index (HPI). Like CEI and LEI, however, all of these are difficult to interpret.

Despite recent advancements in the science of economics, many individuals remain uneducated in basic economic theory and confused by the vast array of economic statistics reported by the media. Furthermore, many people are unable to properly assess their country's current economic performance and contrast it with its past performance; that is: they cannot place current performance within any historical context. These problems arise from a number of factors including:

the sheer number of economic statistics used by business and government, their complexity and reporting biases by the media;

a lack of historical context necessary to convey statistical and economic trends; and a lack of context vis-à-vis other statistics (i.e., not all statistics are created equal with some clearly more important and meaningful than others).

As a result, important information regarding economic performance is lost on the public. For example, many individuals are unable to identify whether it is a good time to solicit an increase in wages, undertake a major expenditure such as an automobile, invest in real assets such as a new or larger home, make changes to the asset allocation of investments or facilitate changes to retirement savings. Businesses also suffer uncertainty when investing in new projects or making important decisions regarding the efficient allocation of capital and labor.

In the political arena, politicians, policy advisors, and even the experts who advise them lack the ability to properly assess current macroeconomic performance. That is, how is the economy performing relative to last month, last year, or a previous generation? What is our economy's performance relative to our trading partners? Are current economic policies working as desired or simply targeting some issue de jour at the expense of the larger macro economy and the general population as a whole? Worst of all, voters are confronted with confusion and uncertainty. Many rely on an ad hoc set of metrics, the media or politicians themselves to explain the economy's performance. Unfortunately, the news media often have political biases and politicians have little incentive to educate voters on actual economic performance and instead manipulate economic information for political advantage.

SUMMARY

It is therefore desirable to construct a new index that is supported by economic theory and has expected overall performance with applied it to specific economies. In addition, it is desirable for the index to be simple enough for the general public to understand and transparent enough to facilitate independent economic assessments by public policy makers. A consistent and transparent indicator of overall economic performance will help guide voters to make better, more informed decisions and keep track of the big picture: an economy with low inflation, low unemployment, sound fiscal policy and rapid economic growth.

Accordingly, in some embodiments, a system includes a computer and an attached database. The database stores inflation, unemployment, budget deficit, and gross domestic product (GDP) data for a variety of time periods for at least one country. The computer determines standard deviations, over a first time period, of an unemployment rate, a ratio of budget deficit to GDP, a GDP rate, and absolute value of an inflation rate. The computer also determines weights for each of the unemployment rate, the ratio of budget deficit to GDP, the GDP rate, and the absolute value of the inflation rate according to the ratio of the average of the standard deviations to the unemployment rate, the ratio of budget deficit to GDP, the GDP rate, and the absolute value of the inflation rate. The computer determines an economic health score for at least a second time period, the second time period being shorter than the first time period. The score is determined by subtracting an unemployment rate, a ratio of budget deficit to GDP, and the absolute value of an inflation rate, each weighted according to their respective determined weights, from a predetermined constant and adding a GDP rate, weighted by the determined weight for the GDP rate.

DETAILED DESCRIPTION

Figure 1:
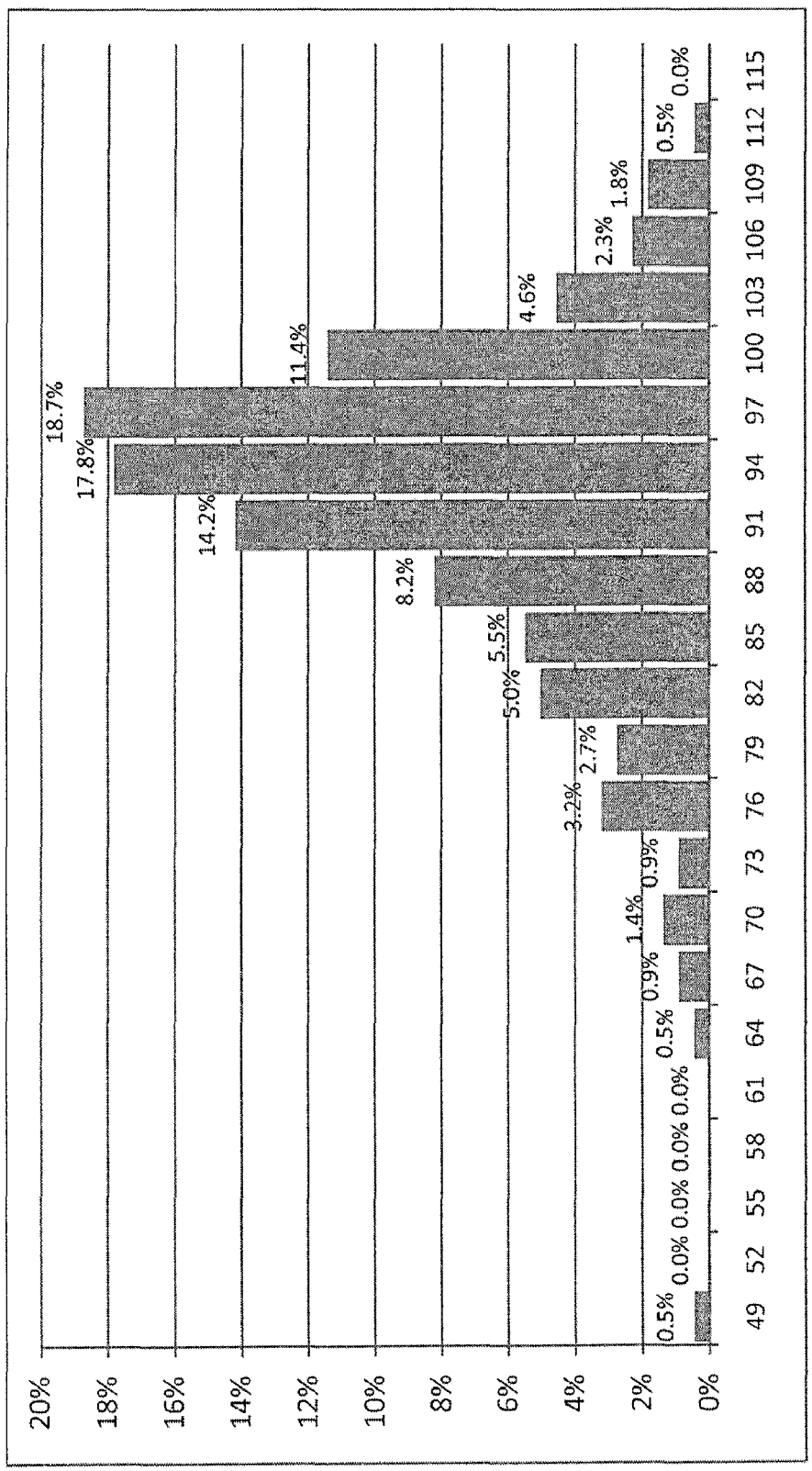
FIG. 1 shows a raw CEPPI score histogram and distribution for the U.S. from 1790 to 2009 according to an embodiment of the invention.

In most embodiments of the invention, a computer system is used to assemble, store, and collate data needed to calculate one or more scores indicative of the overall economic health of a particular country. In many embodiments, the score is called a CEPPI score (Country Economic Performance and Prudence Indicator). Details of the CEPPI score are described below.

It is contemplated that the present systems and methods described herein may be implemented by a general purpose computer or be preformed on a special purpose computer system or computer systems. Those skilled in the art will appreciate that the methods may be implemented in a variety of other environments as well as various other combinations of computer systems or similar devices connected in various ways. In particular, those skilled in the art will appreciate that any of the configured general purpose computers described herein are capable of being made as specific machines that contain hard wired/fabricated logic circuits, custom chips, custom built processors, and so forth such that no general purpose processor and/or general purpose memory are used.

The computer of many embodiments is connected to the Internet or a server computer system by networks other than the Internet. In some embodiments the computer is uniprocessor machine while in others it is a multiprocessor machine. Additionally, in some embodiments, suitable computers include an addressable storage medium such as random access memory and may further include a non-volatile storage medium such as a magnetic or an optical disk.

In many embodiments the computer contains a memory. The memory may contain software incorporating both the method and economic data or other data typically needed. The data may be gathered remotely from other computer networks or the Internet. The memory may further contain a Web server computer program for delivering data in response to requests from Web clients. Those skilled in the art will appreciate that these methods, or portions of them, may be transferred between memory and a persistent storage device for purposes of memory management and data integrity. The server computer system may further contain one or more central processing units for executing methods or programs and a computer-readable medium drive for reading information or installing methods or programs such as computer-readable media, such as a floppy disk, a CD-ROM, or a DVD.

The Country Economic Performance and Prudence Indicator (CEPPI) is a macro-indicator that examines the overall performance of a country's economy and reports any deviation from the desired level of economic performance. Similar to the construction of Gross Domestic Product, which measures the overall output of an economy, CEPPI is based on the notion that the economy consists of four main sectors: households, firms, government and overseas exports. CEPPI is designed to analyze the health of each sector using proxy variables for households, firms and the government plus the real change in GDP to capture the overall direction of the aggregate economy. CEPPI does not use a proxy variable for the overseas sector as the influence of national exports is indirectly measured through GDP.

Under this methodology, in most embodiments CEPPI is comprised of four sub-components:

(1) the inflation rate as a proxy measure for the household sector;

(2) the unemployment rate as a proxy measure for firms;

(3) the budget deficit as a percent of GDP as a proxy measure for the government sector; and (4) the change in real GDP as a measure for the entire economy.

In various embodiments, raw and weighted CEPPI scores are calculated annually, quarterly, or monthly by taking a total score of 100 and subtracting the inflation rate, then the unemployment rate, then the budget deficit as a percentage of GDP and finally, adding back the percentage change in a real gross domestic product, all weighted and calculated as deviations from desired values. In the case of CEPPI scores calculated on other than an annual basis, the rates used to calculate the scores are annualized before the calculation. A color-coded rank is then assigned to these raw and/or weighted scores to further communicate economic performance in a methodology easily understood by everyone.

The raw CEPPI is a very simple metric that assigns equal weights to each of its subcomponents. Later, to overcome problems of consistency during periods of high economic volatility and to make the scores comparable across countries, a normalized CEPPI which uses unequal weights is constructed. However, as described in more detail below, the difference between the raw and normalized CEPPI scores is very small for the U.S. and many other developed nations.

To begin, the optimal Raw CEPPI score is normalized to 100% and any score below 100% is defined as a less than optimal in economic performance. Next, the desired values for each of the indicator's subcomponents are nominally defined, according to some embodiments, as follows:
the desired inflation rate (I*) is 0.0%;
the desired unemployment rate (U*) is 4.75%;
the desired value for government deficit as a share of GDP $$\left(\frac{Def}{GDP^*}\right)$$

is 0.0%, consistent with a balanced budget; and
the desired change in GDP (ΔGDP*) is an above average real growth rate of 4.75%.
Next, the CEPPI score is constructed such that its score:
falls when the inflation rate deviates from its desired value (reflecting the cost-to-households of inflation or deflation);
falls when the unemployment rate rises from its desired value (reflecting the cost to businesses of higher unemployment);
falls when the government deficit rises from its desired value (to account for the prudence of fiscal policy); and
rises with positive growth in GDP (reflecting the value of strong economic growth).
Next, the raw CEPPI formula is defined as the equally weighted deviation from the desired 100% value where CEPPI is equal to:

$$100\% - |I(\%) - I^*| - (U(\%) - U^*) - \left(\frac{Def}{GDP}(\%) - \frac{Def}{GDP^*}\right) + (\Delta GDP(\%) - \Delta GDP^*)$$

Where:
I(%) is the current inflation rate;
U(%) is the current unemployment rate;

$$\frac{Def}{GDP}(\%)$$

is the current budget deficit as a share of GDP; and
ΔGDP(%) is the real GDP growth rate.
It is seen that the desired unemployment rate and the desired change in GDP cancel each other out while the desired inflation rate and the desired budget deficit as a percent of GDP have no effect:

$$CEPPI = 100\% - |I(\%) - 0.0\%| - (U(\%) - 4.75\%) - \left(\frac{Def}{GDP}(\%) - 0.0\%\right) + (\Delta GDP(\%) - 4.75\%) =$$
$$100\% - |I(\%)| - U(\%) - \left(\frac{Def}{GDP}(\%)\right) + \Delta GDP(\%)$$

Substituting the desired values into the formula gives us the desired CEPPI score:

CEPPI=100%−0.0%−4.75%−0.0%+4.75%=100%

Thus, when an economy experiences stable prices or an inflation rate of 0%, an unemployment rate equal to a reasonable 4.75%, a government budget that is balanced and economic growth equal to an above average rate of 4.75%, in many embodiments the CEPPI score registers 100%. Finally, the current CEPPI score is calculated as: 100% minus the absolute value of the inflation rate, minus the unemployment rate, minus the budget deficit as a percentage of GDP, plus the percentage change in a real gross domestic product, all deviations from their desired values. In the case of inflation, any deviation from a stable price level (i.e., positive or negative rates of inflation) leads to welfare losses, so the absolute value of any deviation is taken |I(%)−I*| in the CEPPI formula.

Calculating the Raw CEPPI Score (Quantitatively):

$$100\% - |I(\%)| - U(\%) - \left(\frac{Def}{GDP}(\%)\right) + \Delta GDP(\%)$$

Calculating the Raw CEPPI Score (Qualitatively):

$$100\% - |\text{Inflation Rate}| - \text{Unemployment Rate} - \left(\frac{\text{Budget Deficit}}{GDP}\right) + \text{Change in Real } GDP$$

Changes in the economy affect CEPPI in a very straightforward manner. For example, everything else constant, if the inflation rate increases from 2% to 3%, the CEPPI score falls by 1 point; if the change occurs in the opposite direction, the score rises by one point. On the other hand, if the economy is experiencing deflation and the rate of decline increases from 2% to 3%, the CEPPI score also falls by 1 point. With respect to unemployment, everything else constant, a 1% increase in the unemployment rate leads to a 1 point decrease in the CEPPI score, but a 1% decrease in the unemployment rate leads to a 1 point increase in the CEPPI score. The same inverse relationship holds for the budget deficit: if the deficit increases by 1% of GDP, the CEPPI score falls by one point, but if the budget deficit shrinks by 1% of GDP, the CEPPI scorer rises by one point. Finally, if the percentage growth rate of GDP rises by 1%, the CEPPI score also rises by 1 point, but if the percentage growth rate of GDP falls by 1%, the CEPPI score falls by one point.

The raw CEPPI score histogram and distribution for the U.S. from 1790 to 2009 according to some embodiments are shown in FIG. 1. The distribution is almost symmetric with a mean CEPPI score of 91.83, median of 92.8 and standard deviation of 8.98.

The raw CEPPI score for the years 1790-2009 are plotted in FIG. 1. The historical data is approximately normally distributed, as shown by the bell-shaped distribution in FIG. 1. The median score of 92.8 corresponds to 50% quintile of the CEPPI scores distribution. Symmetric intervals are constructed around the median at +/−20% and +/−40%, which is consistent with four thresholds of the distribution: 90%, 70%, 30%, and 10% quintiles, as shown in Table 1.

TABLE 1

CEPPI scores for United Sates with distribution, 1790-2009.

| | | Actual CEPPI Scores | | | |
|---|---|---|---|---|---|
| | Percentile | Deviation from median | Raw | Weighted | Implemented Grades Threshold |
| Top 10% | >90% | 40% above | 100.27 | 100.07 | 100 |
| Next 20% | 70% | 20% above | 96.60 | 96.49 | 95 |
| Next 40% | 30% | −20% above | 89.10 | 89.30 | 90 |
| Next 20% | 10% | −40% above | 78.48 | 78.36 | 80 |
| Bottom 10% | <10% | all below | | | |

Figure 2:
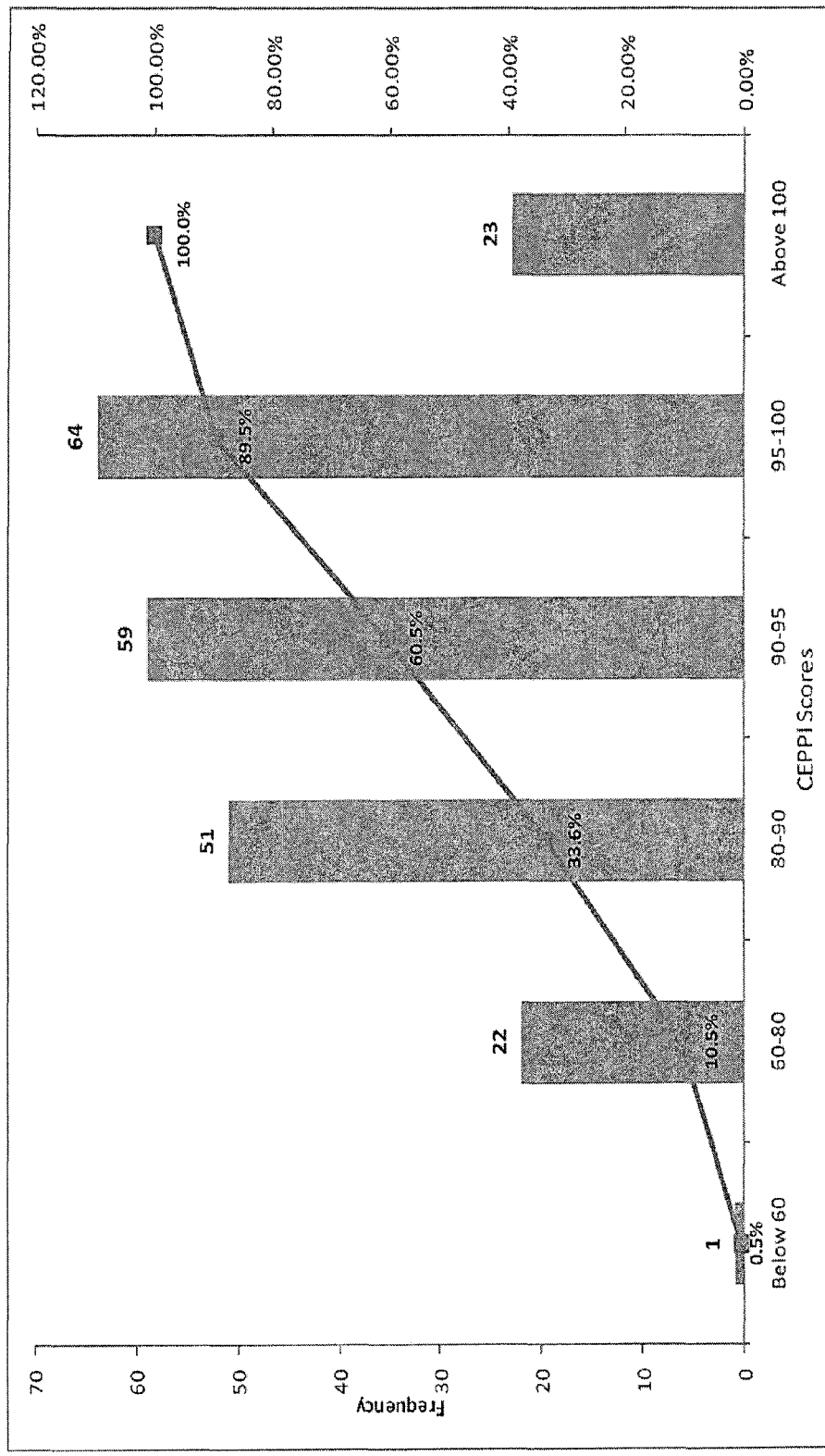
FIG. 2 shows a histogram and cumulative distribution function of the Raw CEPPI scores for the U.S. from 1790-2009 according to an embodiment of the invention.

In order to make the CEPPI indicator easier for the general public to understand, in many embodiments a simple grading system implements thresholds close to the actual distribution of CEPPI scores using a performance scale ranging from "Superior" for the scores above 100, "Excellent" for the scores 95-99.99, "Good" for the scores 90-94.99, "Fair" for the scores 80-89.99, to "Poor" for the scores 60-79.99. The intervals are symmetric around the median, but increase in length as economic performance worsens. This grading scale is consistent with symmetric around median quintiles of CEPPI scores distribution for the U.S. for 1790-2009 as shown in FIG. 2. More specifically, FIG. 2 shows a histogram and cumulative distribution function of the Raw CEPPI scores for the U.S., 1790-2009.

In addition, in many such embodiments, one more threshold is added for periods of "Very Poor" economic performance with very low CEPPI score of 60 and lower (for the U.S. there is only one observation, the Great Depression, with the CEPPI score less than 60). This helps overcome the problem of grading the periods of high economic volatility and increases the precision when measuring periods of exceptional economic performance. This grading system is shown on the left side of Table 2. In some embodiments, a school-like letter grading system is used, as shown on the right side of Table 2.

TABLE 2

CEPPI economic performance grading systems

| Grade | CEPPI values | Grade | CEPPI values |
|---|---|---|---|
| Superior | Above 100 | A+ | ≧99 |
| Excellent | 95-99.99 | A | 96-99 |
| Good | 90-94.99 | A− | 95-96 |
| Fair | 80-89.99 | B+ | 94-95 |
| Poor | 60-79.99 | B | 91-14 |
| Very Poor | Below 60 | B− | 90-91 |
| | | C+ | 87-90 |
| | | C | 82-87 |
| | | C− | 80-82 |
| | | D+ | 76-80 |
| | | D | 65-76 |
| | | D− | 60-65 |
| | | F | <60 |

To overcome problems of consistency during periods of high economic volatility and to make the scores comparable across countries, the data is normalized by introducing weights to each sub-component. Weights are determined by calculating the reciprocal of the standard deviation of each economic variable multiplied by the average standard deviation of all variables such that the average of the reciprocal of the weights is equal to one. More specifically, $$\text{CEPPI\_W} = 100\% - W_{Inf}|I(\%) - I^*| - W_{Unem}(U(\%) - U^*) - W_{Def}\left(\frac{Def}{GDP(\%)} - \frac{Def}{GDP^*}\right) + W_{GDP}(\Delta GDP(\%) - \Delta GDP^*)$$

Where:
$W_i$ is the weight of each component of the indicator, calculated by the formula:

$$W_i = \frac{1}{StD_i} StDev_{Ave}$$

Where:

$$StD_i = \text{Standard Deviation of a Variable } i = \sqrt{\frac{1}{T-1}\sum_{t=1}^{T}(Y_t - \text{Mean of }(Y_t))},$$

and $$StDev_{Ave} = \frac{1}{4}\sum_{i=1}^{4} StD_i$$

Where:
$Y_t$ is the value of a variable (inflation, or unemployment, or deficit as a share of GDP, or GDP growth) in period t.

In many embodiments, the standard deviations are calculated over the entire period for which data is available and stored in a database used by the computer. In other embodiments, the standard deviations are calculated over only a portion of the period for which data is available and stored in the database. In the later cases, data for some periods may not be as reliable as other periods, fundamental economic changes have taken place between various different periods resulting in significantly differing deviation patterns in different periods, or some other reason may be determined to cause the deviations in one period not consistent with the deviations in another period.

For developed nations, there are generally only small differences between the raw scores and the weighted scores. However, for emerging economies, differences can be significant and normalized data is essential to presenting a true picture of economic performance. In some embodiments, the standard deviations of the elements of the CEPPI score are determined over the data of multiple countries. Typically, in such embodiments, though, the multiple countries used in calculation the standard deviations have significant economic similarities, such as all being either developed or developing countries.

One potential concern of an indicator is if it contains components that are too highly correlated. In the case of CEPPI scores, though, the correlations between variables are small (not more than 0.25 in absolute value) and there is no statistically significant causality between them. Also, CEPPI does not use or make orthogonal decomposition of economic performance. On the contrary, CEPPI is constructed to analyze general efficiency of the economy by comprising (not decomposing) the four components: inflation, unemployment, budget deficit, and GDP growth.

The correlation matrix for the four CEPPI components using U.S. data is shown in Table 3. Pairwise correlations are small in magnitude (Table 2).

TABLE 3

Correlations between CEPPI Components

| | |Inflation| | Unemployment | Budget Deficit | GDP Growth |
|---|---|---|---|---|
| |Inflation| | 1.000 | 0.024 | 0.226 | −0.160 |
| Unemployment | | 1.000 | 0.015 | −0.130 |
| Budget Deficit | | | 1.000 | 0.103 |
| GDP Growth | | | | 1.000 |

Various alternate embodiments have been described as well as examples of specific alternates being combined. However, it is recognized that, for the most part, each of the alternate embodiments may be combined with one or more of the other embodiments and all of these combination are contemplated and intended, even each of the enormous number of combinations are not specifically discussed. The present invention has been described and is illustrated with respect to embodiments thereof, it is to be understood that it is not to be so limited, since changes and modifications may be made therein which are within the full intended scope of this invention as hereinafter claimed.

What is claimed is:

1. A system comprising:
a computer; and
a database connected to the computer, the database storing inflation, unemployment, budget deficit, and gross domestic product (GDP) data for a plurality of time periods for at least one country, the computer configured to determine standard deviations, over a first time period, of an unemployment rate, a ratio of budget deficit to GDP, a GDP rate, and absolute value of an inflation rate and configured to determine weights for each of the unemployment rate, the ratio of budget deficit to GDP, the GDP rate, and the absolute value of the inflation rate according to the ratio of the average of the standard deviations to the unemployment rate, the ratio of budget deficit to GDP, the GDP rate, and the absolute value of the inflation rate;
the computer further configured to determine an economic health score for at least a second time period, the second time period being shorter than the first time period, for one or more of the at least one countries, the score being determined, using the data stored in the database, by subtracting an unemployment rate, a ratio of budget deficit to GDP, and the absolute value of an inflation rate, each weighted according to their respective determined weights, from a predetermined constant representing superior economic performance and adding a GDP rate, weighted by the determined weight for the GDP rate.

2. A method, using a database connected to the computer, the database storing inflation, unemployment, budget deficit, and gross domestic product (GDP) data for a plurality of time periods for at least one country, comprising:
using a computer, determining standard deviations, over a first time period, of an unemployment rate, a ratio of budget deficit to GDP, a GDP rate, and absolute value of an inflation rate and determining weights for each of the unemployment rate, the ratio of budget deficit to GDP, the GDP rate, and the absolute value of the inflation rate according to the ratio of the average of the standard deviations to the unemployment rate, the ratio of budget deficit to GDP, the GDP rate, and the absolute value of the inflation rate;
using a computer, determining an economic health score for at least a second time period, the second time period being shorter than the first time period, for one or more of the at least one countries, wherein the score is determined, using the data stored in the database, by subtracting an unemployment rate, a ratio of budget deficit to GDP, and the absolute value of an inflation rate, each weighted according to their respective determined weights, from a predetermined constant representing superior economic performance and adding a GDP rate, weighted by the determined weight for the GDP rate.

\* \* \* \* \*